(12) United States Patent
Huang et al.

(10) Patent No.: US 9,267,005 B2
(45) Date of Patent: Feb. 23, 2016

(54) FLEXIBLE MALEIMIDE POLYMER AND METHOD FOR PREPARING THE SAME

(75) Inventors: Li-Fu Huang, Taoyuan (TW); Li-Duan Tsai, Hsinchu (TW); Wei-Hsin Wu, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 212 days.

(21) Appl. No.: 13/549,606

(22) Filed: Jul. 16, 2012

(65) Prior Publication Data

US 2013/0172518 A1 Jul. 4, 2013

(30) Foreign Application Priority Data

Dec. 29, 2011 (TW) .............................. 100149463 A

(51) Int. Cl.
*C08G 73/10* (2006.01)
*C08G 73/12* (2006.01)
*C08L 79/08* (2006.01)

(52) U.S. Cl.
CPC ............. *C08G 73/124* (2013.01); *C08L 79/085* (2013.01)

(58) Field of Classification Search
CPC .................................................... C08G 73/124
See application file for complete search history.

(56) References Cited

U.S. PATENT DOCUMENTS 3,717,615 A * 2/1973 Holub et al. .................. 525/422
4,116,937 A * 9/1978 Jones et al. .................... 528/170

(Continued)

FOREIGN PATENT DOCUMENTS

| CN | 101219349 A | 7/2008 |
| CN | 101367903 A | 2/2009 |

(Continued)

OTHER PUBLICATIONS

Seris et al (Thermally and Anionically Initiated Cure of Bismaleimide Monomers, Journal of Applied Polymer Science, vol. 48, 257-269, 1993).*

*Primary Examiner* — Rachel Kahn
(74) *Attorney, Agent, or Firm* — Birch, Stewart, Kolasch & Birch, LLP.

(57) ABSTRACT

Disclosed is a flexible maleimide polymer. The flexible maleimide polymer includes a reaction product of reactants (a)-(c). The reactant (a) is maleimide, a compound with a structure represented by Formula (I), a compound with a structure represented by Formula (II), or combinations thereof

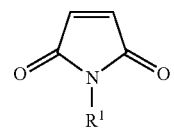

Formula (I)

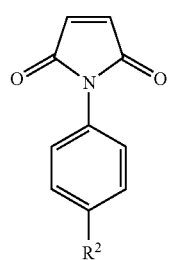

Formula (II)

wherein $R^1$ is —$(CH_2)_{10}$—$CO_2H$, and $R^2$ is H, OH, $SO_3Na$, $NO_2$, CN or $CO_2H$. The reactant (b) is a compound with a structure represented by formula (III)

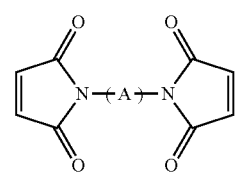

Formula (III)

wherein A is

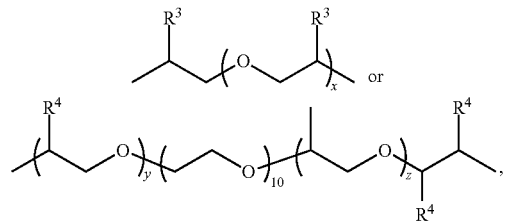

$R^3$ is H or methyl group, x is between 1-12, $R^4$ is H or methyl group, and y and z are both between 1-5. The reactant (c) is a compound with a structure represented by formula (IV), or a compound with a structure represented by formula (V)

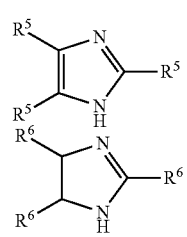

Formula (IV)

Formula (V)

wherein $R^5$ and $R^6$ are independent H or $C_{1-4}$ alkyl group.

4 Claims, No Drawings

(56) References Cited

U.S. PATENT DOCUMENTS

| | | | |
|---|---|---|---|
| 4,876,358 A * | 10/1989 | Alexander | 548/521 |
| 2006/0194096 A1 | 8/2006 | Valle et al. | |
| 2009/0269491 A1 | 10/2009 | Hammond-Cunningham et al. | |
| 2010/0130625 A1 | 5/2010 | Chang et al. | |
| 2010/0166966 A1 | 7/2010 | Chang et al. | |
| 2010/0167101 A1 | 7/2010 | Wang et al. | |
| 2010/0167102 A1 | 7/2010 | Pan et al. | |
| 2011/0033773 A1 | 2/2011 | Chang et al. | |
| 2011/0117454 A1 | 5/2011 | Winther-Jensen et al. | |

FOREIGN PATENT DOCUMENTS

| | | |
|---|---|---|
| CN | 101510615 A | 8/2009 |
| CN | 101747572 A | 6/2010 |
| CN | 101887979 A | 11/2010 |
| CN | 101931086 A | 12/2010 |
| TW | 201020263 A | 6/2010 |
| TW | 201024343 A | 7/2010 |
| TW | 201024344 A1 | 7/2010 |
| TW | 201105716 A1 | 2/2011 |

\* cited by examiner

FLEXIBLE MALEIMIDE POLYMER AND METHOD FOR PREPARING THE SAME

CROSS REFERENCE TO RELATED APPLICATIONS

This application is based upon and claims the benefit of priority from the prior Taiwan Patent Application No. 100149463, filed on Dec. 29, 2011, the entire contents of which are incorporated herein by reference.

TECHNICAL FIELD

The disclosure relates to a maleimide polymer, and in particular relates to a flexible maleimide polymer.

BACKGROUND

Due to its high thermal stability, mechanical strength, and resistance to chemical corrosion, maleimide polymer is applied in a variety of electrical devices. A coating made of the conventional maleimide polymer, however, exhibits inferior film extensibility due to the rigid aromatic linking chain of the conventional maleimide polymer. Further, the conventional maleimide polymer has a high dimensional change under high temperature or by water absorption due the poor dimensional stability of the conventional maleimide polymer.

Moreover, in order to improve the ionic electrical conductivity, a polymer with high ionic electrical conductivity has to be used to blend with the conventional maleimide polymer. Therefore, the application of the maleimide polymer is limited.

SUMMARY

One embodiment provides a flexible maleimide polymer which includes a reaction product of reactants (a)-(c). Particularly, the reactant (a) is maleimide, a compound with a structure represented by Formula (I), a compound with a structure represented by Formula (II), or combinations thereof

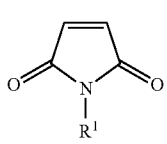

Formula (I)

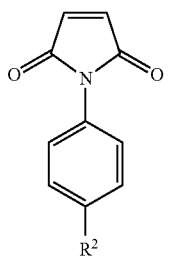

Formula (II)

wherein $R^1$ is —$(CH_2)_{10}$—$CO_2H$, and $R^2$ is H, OH, $SO_3Na$, $NO_2$, CN or $CO_2H$. The reactant (b) is a compound with a structure represented by formula (II)

Formula (III)

wherein A is

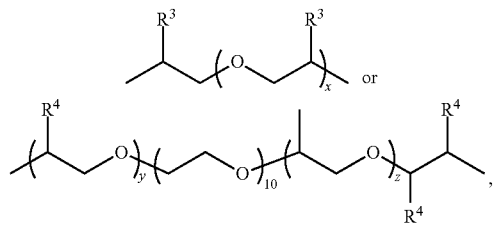

$R^3$ is H or methyl group, x is between 1-12, $R^4$ is H or methyl group, and y and z are both between 1-5. The reactant (c) is a compound with a structure represented by formula (IV), or a compound with a structure represented by formula (V)

Formula (IV)

Formula (V)

wherein $R^5$ and $R^6$ are independent H or $C_{1-4}$ alkyl group.

Another embodiment provides a method for preparing the aforementioned flexible maleimide polymer. The method includes reacting the reactant (a) with the reactant (b) in the presence of a reactant (c) undergoing a polymerization to obtain the flexible maleimide polymer.

A detailed description is given in the following embodiments with reference to the accompanying drawings.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

According to embodiments of the disclosure, a flexible maleimide polymer with high dimensional stability, mechanical strength, and water retaining capacity is provided. The flexible maleimide polymer includes a reaction product of reactants (a)-(c). Particularly, the reactant (a) is maleimide (having a structure represented by

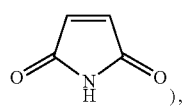

a compound with a structure represented by Formula (I), a compound with a structure represented by Formula (II), or combinations thereof

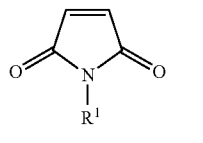

Formula (I)

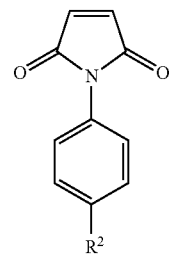

Formula (II)

wherein $R^1$ is —$(CH_2)_{10}$—$CO_2H$, and $R^2$ is H, OH, $SO_3Na$, $NO_2$, CN or $CO_2H$. In order to improve the ionic electrical conductivity of the flexible maleimide polymer, the reactant (a) can include a compound represented by

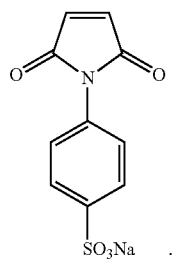

The reactant (b) is a compound with a structure represented by formula (III)

Formula (III)

wherein A is

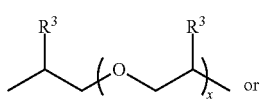 or

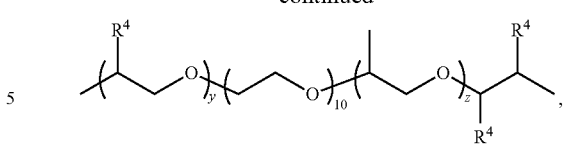

$R^3$ is H or methyl group, x can be between 1-12 and can not be an integer. For example, x can be 3.5, 5.5, 6.1 or 7.5 (an average value measured by evaluating the molecular weight of reactant (b)). $R^4$ is H or methyl group, and y and z are both between 1-5. Due to the flexible linking chain A, the maleimide polymer prepared from the reactant (b) has superior extensibility and elasticity.

The reactant (b) can have long-chain polyethylene oxide (PEO) linking chain, such as

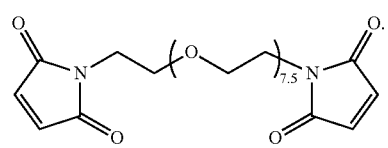

Further, the reactant (b) can have branched polyethylene oxide, such as

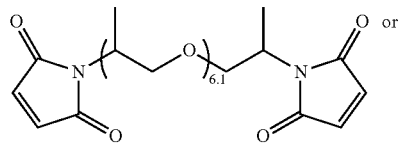

(y and z are from 1-5). The reactant (c) is a compound with a structure represented by formula (IV), or a compound with a structure represented by formula (V)

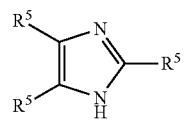

Formula (IV)

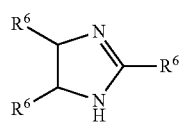

Formula (V)

wherein $R^5$ and $R^6$ are independent H or $C_{1-4}$ alkyl group. For example, the reactant (c) can be a nitrogen-containing heterocyclic compound, such as imidazole

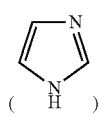

or 2,4-dimethyl-4,5-dihydro-1H-imidazole

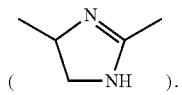.

According to an embodiment of the disclosure, the reactant (a) can include maleimide

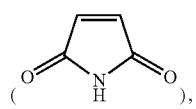, and the molar ratio between the maleimide and the reactant (c) can be from 5:0.05 to 1:1, or from 4:1 to 1:1. The molecular weight of the flexible maleimide polymer is in inverse ratio to the amount of the reactant (c), and the flexible maleimide polymer with high molecular weight is apt to form gel. Further, the reactant (a) can be, or further include, a maleimide with a functional group (such as

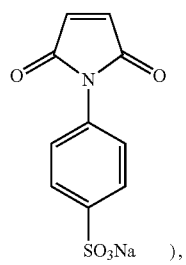), in order to modify the flexible maleimide polymer. The reactant (a) can include the compound with the structure represented by Formula (I) (and/or the compound with the structure represented by Formula (II)), and the molar ratio between the compound with the structure represented by Formula (I) (or Formula (II)) and the reactant (c) is from 4:0.05 to 1:1. Moreover, the molar ratio between the reactant (b) and the reactant (c) is from 2:0.05 to 1:1 or from 1:0.25 to 1:1.

In an embodiment of the disclosure, the method for preparing the flexible maleimide polymer includes the following steps. First, the reactants (a)-(c) are dissolved in an organic solvent (such as dimethyl acetamide (DMAC), or N-methylpyrrolidone (NMP), obtaining a mixture. Next, the mixture is heated and stirred to undergo a polymerization at a reaction temperature. After reacting for a period of time (such as 4-10 hrs), a solution including the flexible maleimide polymer is obtained. The reaction temperature can be from 25 to 180° C. For example, the mixture can be reacted at room temperature or below the boiling point of the organic solvent.

Preparation of Flexible Maleimide Polymer

Example 1

5.12 mmole of maleimide

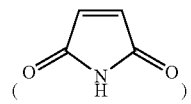

(reactant (a)), 1.28 mmole of

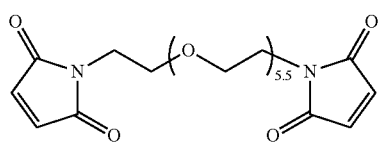

(reactant (b)), 1.28 mmole of

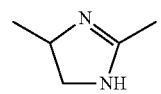

(reactant (c)), and 30 mL of DMAC (serving as a solvent) were added to a reaction bottle, wherein the molar ratio between

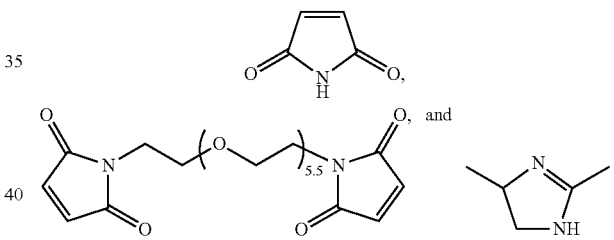

was 4:1:1. Next, the mixture was stirred at 100° C. and continuously examined by gel permeation chromatography (GPC) to confirm the presence of reactants (a) and (b). After reacting for 6 hrs, a red transparent solution including a flexible maleimide polymer was obtained.

Example 2

5.12 mmole of maleimide

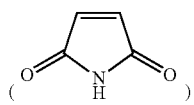

(reactant (a)), 1.28 mmole of

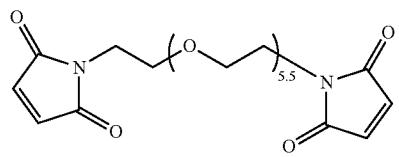

(reactant (b)), 1.28 mmole of

(reactant (c)), and 30 mL of DMAC (serving as a solvent) were added to a reaction bottle, wherein the molar ratio between

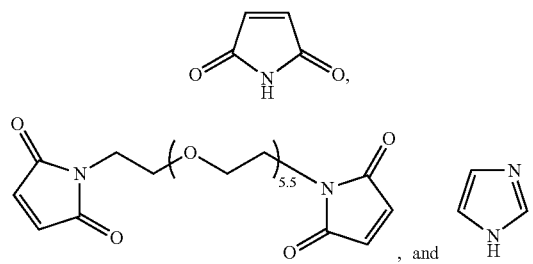
, and 

was 4:1:1. Next, the mixture was stirred at 100° C. and continuously examined by gel permeation chromatography (GPC) to confirm the presence of reactants (a) and (b). After reacting for 6 hrs, a wine-red solution including a flexible maleimide polymer was obtained.

Example 3

3.84 mmole of maleimide

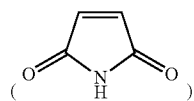

(reactant (a)), 1.28 mmole of

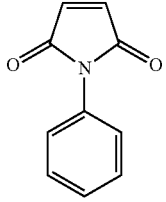 [SMILES: O=C1C=CC(=O)N1c1ccccc1]

(reactant (a)), 1.28 mmole of

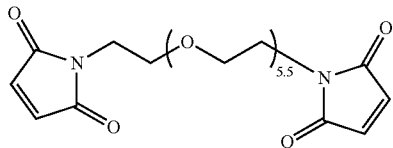

(reactant (b)), 1.28 mmole of

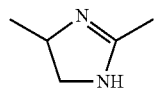

(reactant (c)), and 30 mL of DMAC (serving as a solvent) were added to a reaction bottle, wherein the molar ratio between

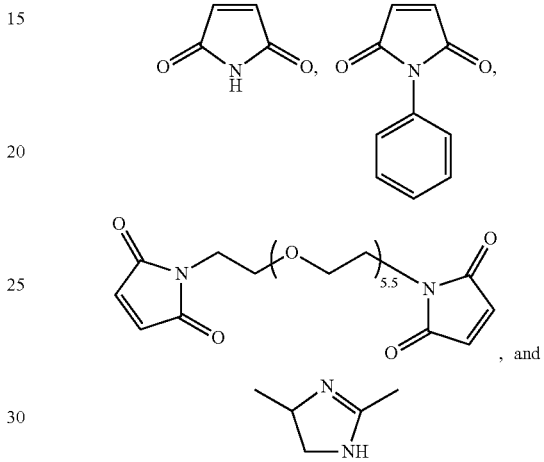
, and 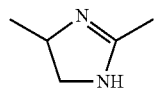

was 3:1:1:1. Next, the mixture was stirred at 100° C. and continuously examined by gel permeation chromatography (GPC) to confirm the presence of reactants (a) and (b). After reacting for 6 hrs, a dark red solution including a flexible maleimide polymer was obtained.

Example 4

4.32 mmole of maleimide

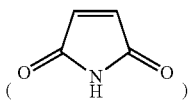

(reactant (a)), 1.44 mmole of

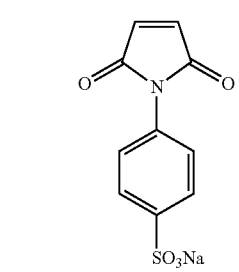

(reactant (a)), 1.44 mmole of

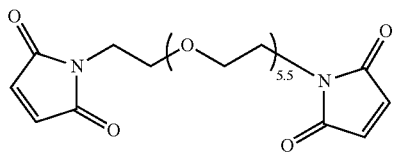

(reactant (b)), 1.44 mmole of

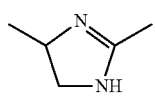

(reactant (c)), and 30 mL of DMAC (serving as a solvent) were added to a reaction bottle, wherein the molar ratio between

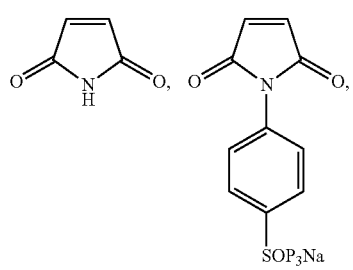

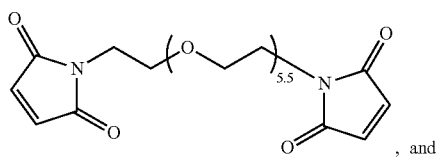, and

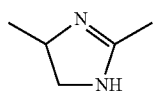

was 3:1:1:1. Next, the mixture was stirred at 100° C. and continuously examined by gel permeation chromatography (GPC) to confirm the presence of reactants (a) and (b). After reacting for 6 hrs, a wine-red solution including a flexible maleimide polymer was obtained.

Example 5

4.32 mmole of maleimide

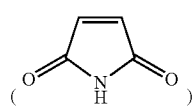

(reactant (a)), 1.44 mmole of

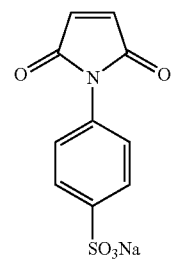

(reactant (a)), 1.44 mmole of

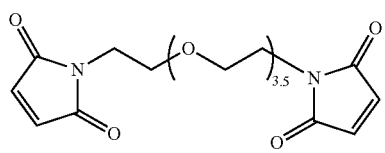

(reactant (b)), 1.44 mmole of

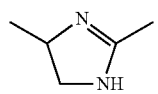

(reactant (c)), and 30 mL of DMAC (serving as a solvent) were added to a reaction bottle, wherein the molar ratio between

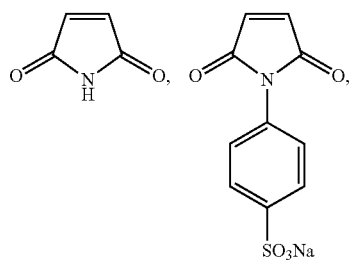

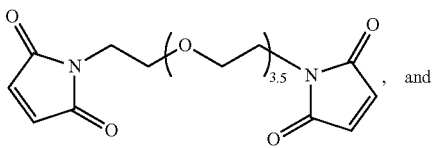, and

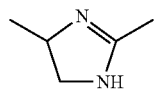

was 3:1:1:1. Next, the mixture was stirred at 100° C. and continuously examined by gel permeation chromatography (GPC) to confirm the presence of reactants (a) and (b). After reacting for 6 hrs, a red transparent solution including a flexible maleimide polymer was obtained.

Example 6

7.17 mmole of maleimide

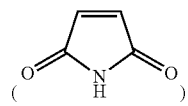

(reactant (a)), 2.39 mmole of

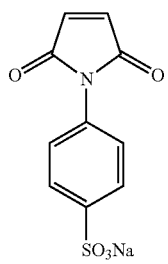

(reactant (a)), 2.39 mmole of

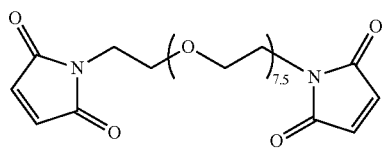

(reactant (b)), 2.39 mmole of

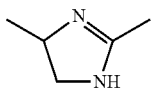

(reactant (c)), and 30 mL of DMAC (serving as a solvent) were added to a reaction bottle, wherein the molar ratio between

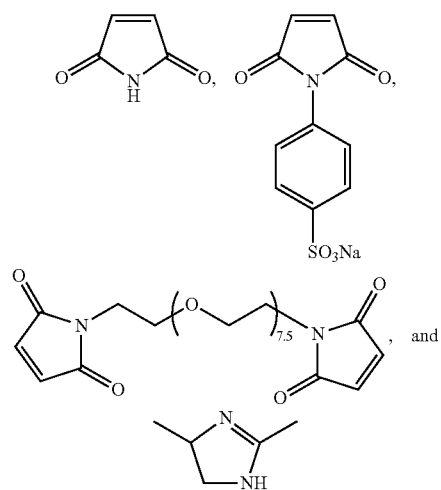

was 3:1:1:1. Next, the mixture was stirred at 100° C. and continuously examined by gel permeation chromatography (GPC) to confirm the presence of reactants (a) and (b). After reacting for 6 hrs, a red transparent solution including a flexible maleimide polymer was obtained.

Example 7

3.60 mmole of maleimide

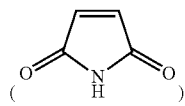

(reactant (a)), 1.20 mmole of

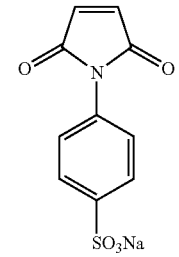

(reactant (a)), 1.20 mmole of

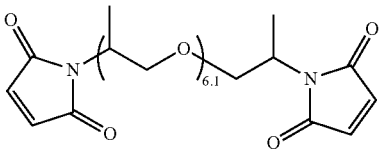

(reactant (b)), 1.20 mmole of

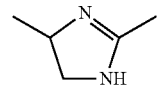

(reactant (c)), and 30 mL of DMAC (serving as a solvent) were added to a reaction bottle, wherein the molar ratio between

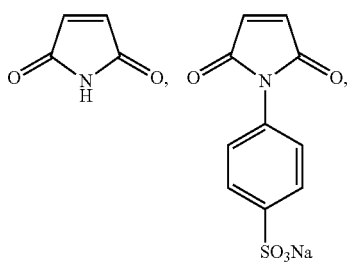

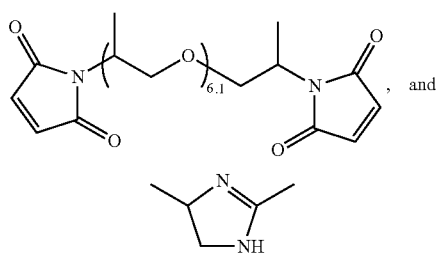, and was 3:1:1:1. Next, the mixture was stirred at 100° C. and continuously examined by gel permeation chromatography (GPC) to confirm the presence of reactants (a) and (b). After reacting for 6 hrs, a red transparent solution including a flexible maleimide polymer was obtained.

Example 8

2.52 mmole of maleimide

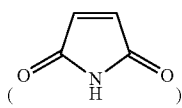

(reactant (a)), 0.84 mmole of (reactant (a)), 0.84 mmole of

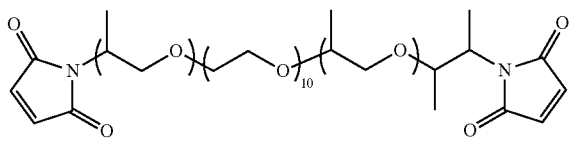

(reactant (b)), 0.84 mmole of

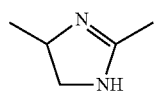

(reactant (c)), and 30 mL of DMAC (serving as a solvent) were added to a reaction bottle, wherein the molar ratio between was 3:1:1:1. Next, the mixture was stirred at 100° C. and continuously examined by gel permeation chromatography (GPC) to confirm the presence of reactants (a) and (b). After reacting for 6 hrs, a red transparent solution including a flexible maleimide polymer was obtained.

Example 9

Example 9 was performed as Example 6 except for substitution of 1.2 mmole of

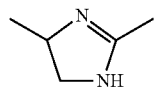

for 2.39 mmole of

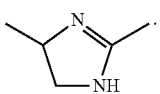

Particularly, the molar ratio between

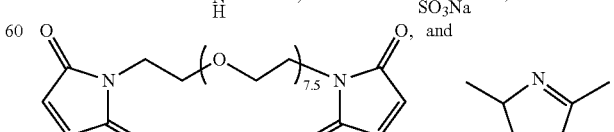

was 3:1:1:0.5.

Example 10

Example 10 was performed as Example 6 except for substitution of 0.6 mmole of

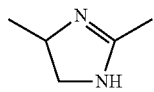

for 2.39 mmole of

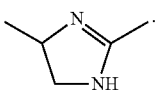

Particularly, the molar ratio between

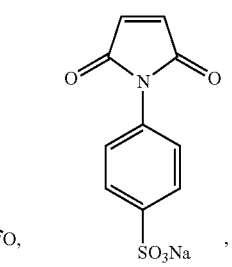

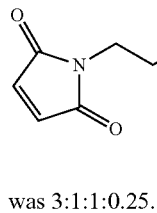

was 3:1:1:0.25.

Example 11

Example 11 was performed as Example 6 except for substitution of 4.78 mmole of

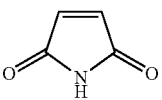

for 7.17 mmole of

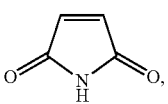

and substitution of 4.78 mmole of

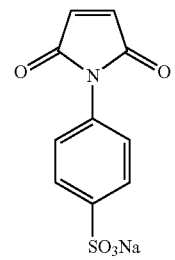

for 2.39 mmole of

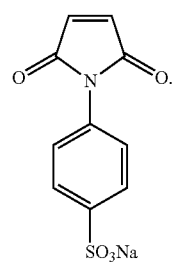

Particularly, the molar ratio between

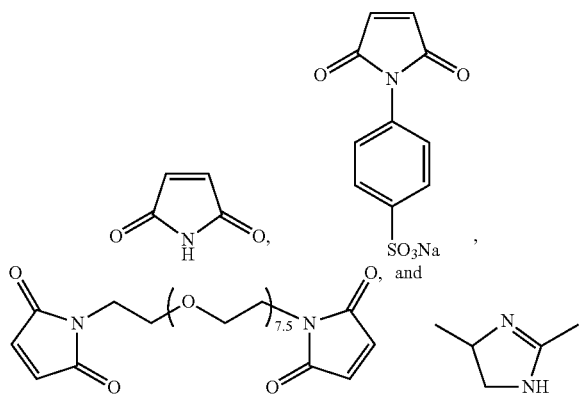

was 2:2:1:1.

Example 12

Example 12 was performed as Example 6 except for substitution of 4.78 mmole of

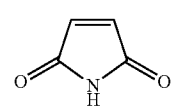

for 7.17 mmole of

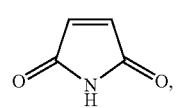

substitution of 4.78 mmole of
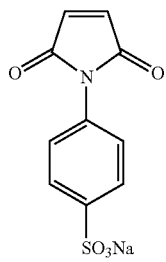
for 2.39 mmole of
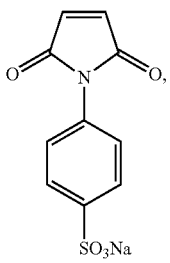
and substitution of 1.2 mmole of
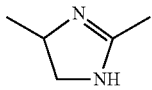
for 2.39 mmole of
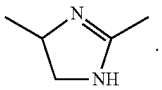.
Particularly, the molar ratio between
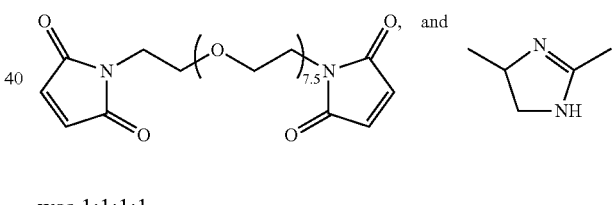
was 2:2:1:0.5.
Example 13
Example 13 was performed as Example 6 except for substitution of 2.39 mmole of
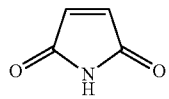
for 7.17 mmole of
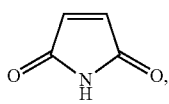,
Particularly, the molar ratio of
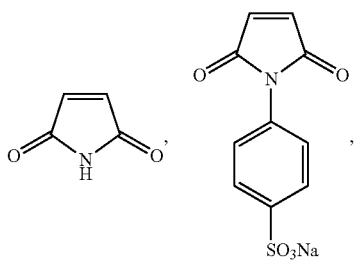
was 1:1:1:1.
Example 14
Example 14 was performed as Example 6 except for substitution of 11.95 mmole of
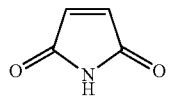
for 7.17 mmole of
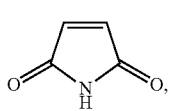, Particularly, the molar ratio between
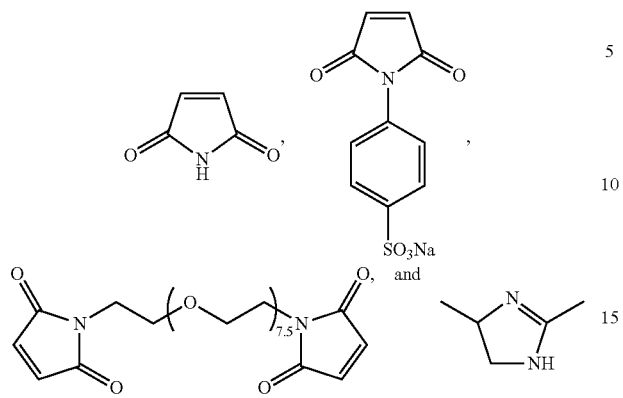
was 5:1:1:1.
Example 15
Example 15 was performed as Example 6 except for substitution of 11.95 mmole of
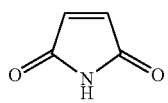
for 7.17 mmole of
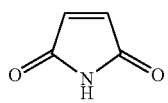
substitution of 7.17 mmole of
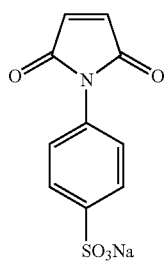
for 2.39 mmole of
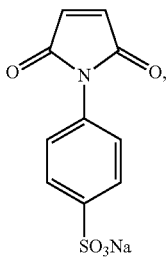
substitution of 4.78 mmole of
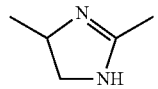
for 2.39 mmole of
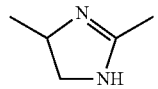
and substitution of 0.12 mmole of
for 2.39 mmole of
Particularly, the molar ratio between
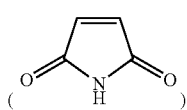
was 5:3:2:0.05.
Example 16
2.58 mmole of maleimide (reactant (a)), 0.86 mmole of

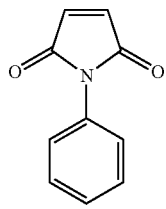

(reactant (a)), 0.86 mmole of

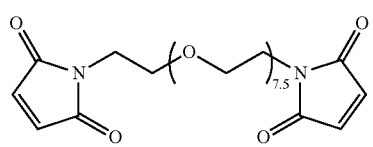

(reactant (b)), 0.86 mmole of

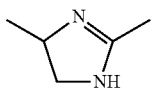

(reactant (c)), and 30 mL of DMAC (serving as a solvent) were added to a reaction bottle, wherein the molar ratio between

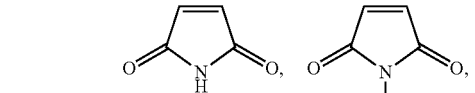

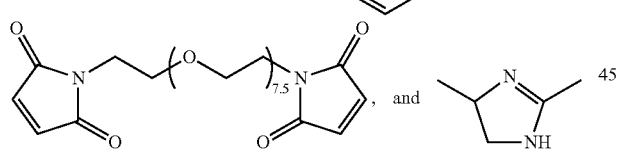

was 3:1:1:1. Next, the mixture was stirred at 100° C. and continuously examined by gel permeation chromatography (GPC) to confirm the presence of reactants (a) and (b). After reacting for 6 hrs, an orange red transparent solution including a flexible maleimide polymer was obtained.

Example 17

2.55 mmole of maleimide

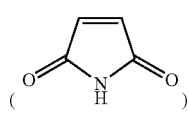

(reactant (a)), 0.85 mmole of

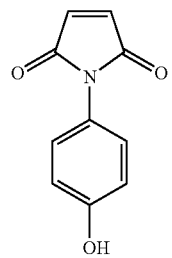 [SMILES: O=C1C=CC(=O)N1c1ccc(O)cc1]

(reactant (a)), 0.85 mmole of

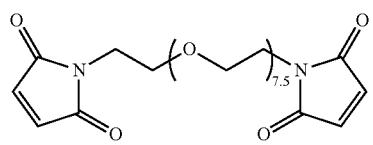

(reactant (b)), 0.85 mmole of

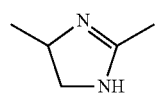

(reactant (c)), and 30 mL of DMAC (serving as a solvent) were added to a reaction bottle, wherein the molar ratio between

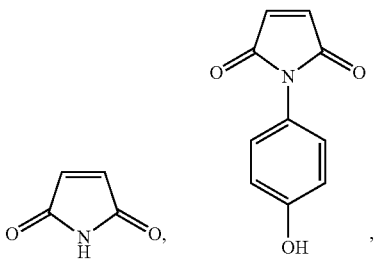

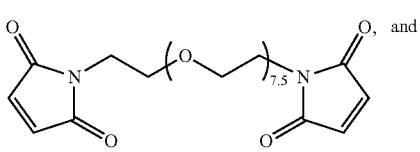

was 3:1:1:1. Next, the mixture was stirred at 100° C. and continuously examined by gel permeation chromatography (GPC) to confirm the presence of reactants (a) and (b). After reacting for 6 hrs, a red transparent solution including a flexible maleimide polymer was obtained.

Example 18

2.49 mmole of maleimide

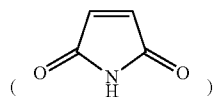

(reactant (a)), 0.83 mmole of

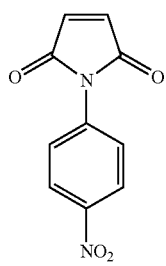

(reactant (a)), 0.83 mmole of

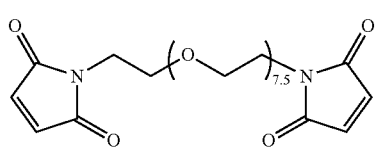

(reactant (b)), 0.83 mmole of

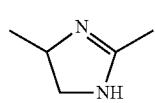

(reactant (c)), and 30 mL of DMAC (serving as a solvent) were added to a reaction bottle, wherein the molar ratio between

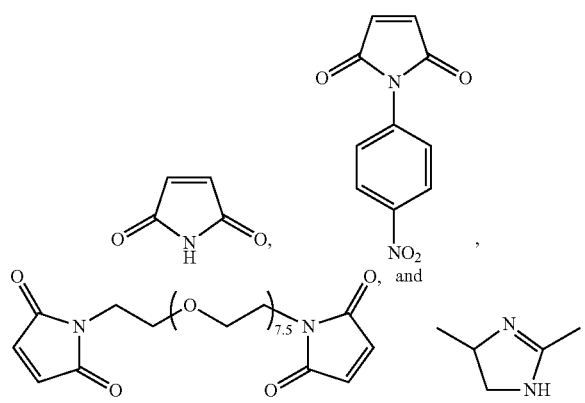

was 3:1:1:1. Next, the mixture was stirred at 100° C. and continuously examined by gel permeation chromatography (GPC) to confirm the presence of reactants (a) and (b). After reacting for 6 hrs, a dark red transparent solution including a flexible maleimide polymer was obtained.

Example 19

2.52 mmole of maleimide

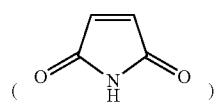

(reactant (a)), 0.84 mmole of

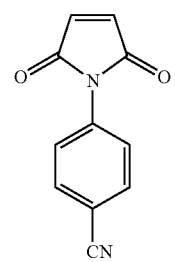

(reactant (a)), 0.84 mmole of

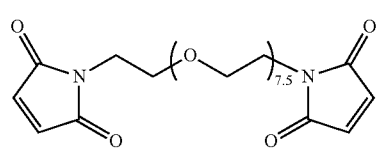

(reactant (b)), 0.84 mmole of

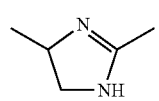

(reactant (c)), and 30 mL of DMAC (serving as a solvent) were added to a reaction bottle, wherein the molar ratio between was 3:1:1:1. Next, the mixture was stirred at 100° C. and continuously examined by gel permeation chromatography (GPC) to confirm the presence of reactants (a) and (b). After reacting for 6 hrs, a wine-red transparent solution including a flexible maleimide polymer was obtained.

Example 20

2.49 mmole of maleimide

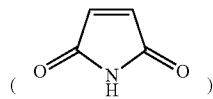

(reactant (a)), 0.83 mmole of

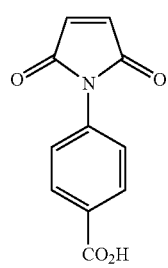

(reactant (a)), 0.83 mmole of

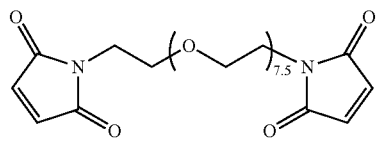

(reactant (b)), 0.83 mmole of

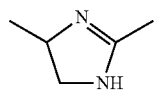

(reactant (c)), and 30 mL of DMAC (serving as a solvent) were added to a reaction bottle, wherein the molar ratio between

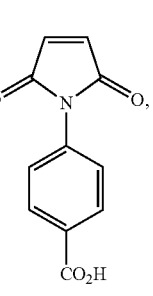

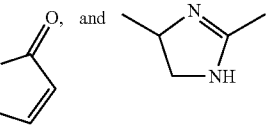

was 3:1:1:1. Next, the mixture was stirred at 100° C. and continuously examined by gel permeation chromatography (GPC) to confirm the presence of reactants (a) and (b). After reacting for 6 hrs, a wine-red transparent solution including a flexible maleimide polymer was obtained.

Example 21

2.37 mmole of maleimide

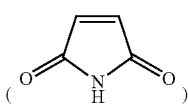

(reactant (a)), 0.79 mmole of

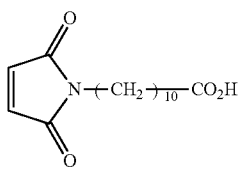

(reactant (a)), 0.79 mmole of

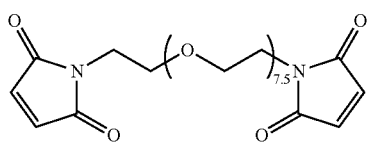

(reactant (b)), 0.79 mmole of

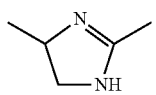

(reactant (c)), and 30 mL of DMAC (serving as a solvent) were added to a reaction bottle, wherein the molar ratio between

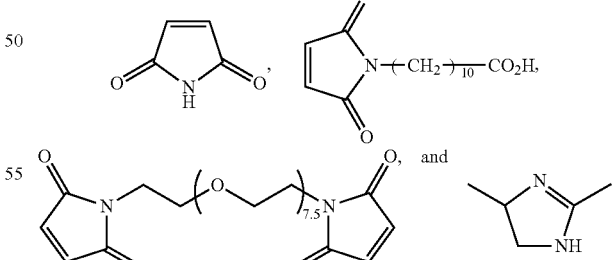

was 3:1:1:1. Next, the mixture was stirred at 100° C. and continuously examined by gel permeation chromatography (GPC) to confirm the presence of reactants (a) and (b). After reacting for 6 hrs, a wine-red transparent solution including a flexible maleimide polymer was obtained.

The reactants (a)-(c) and the phase of flexible maleimide polymers as disclosed in Examples 1-21 are shown in Table 1.

TABLE 1

| | reactant (a) | reactant (b) | reactant (c) | Molar ratio between reactants | phase |
|---|---|---|---|---|---|
| Example 1 | maleimide | bis-maleimide-PEG (n=5.5) | 2,4-dimethyl-4,5-dihydro-1H-imidazole | 4:1:1 | liquid |
| Example 2 | maleimide | bis-maleimide-PEG (n=5.5) | imidazole | 4:1:1 | liquid |
| Example 3 | maleimide & N-phenylmaleimide | bis-maleimide-PEG (n=5.5) | 2,4-dimethyl-4,5-dihydro-1H-imidazole | 3:1:1:1 | liquid |
| Example 4 | maleimide & N-(4-sulfonatophenyl)maleimide sodium salt | bis-maleimide-PEG (n=5.5) | 2,4-dimethyl-4,5-dihydro-1H-imidazole | 3:1:1:1 | liquid |
| Example 5 | maleimide & N-(4-sulfonatophenyl)maleimide sodium salt | bis-maleimide-PEG (n=3.5) | 2,4-dimethyl-4,5-dihydro-1H-imidazole | 3:1:1:1 | liquid |

TABLE 1-continued

| | reactant (a) | reactant (b) | reactant (c) | Molar ratio between reactants | phase |
|---|---|---|---|---|---|
| Example 6 | maleimide (NH) & N-(4-sulfonatophenyl)maleimide, Na salt | bis-maleimide-PEG, (OCH$_2$CH$_2$)$_{7.5}$ | 2,4-dimethyl-4,5-dihydro-1H-imidazole | 3:1:1:1 | liquid |
| Example 7 | maleimide (NH) & N-(4-sulfonatophenyl)maleimide, Na salt | bis-maleimide-PPG, (OCH$_2$CH(CH$_3$))$_{6.1}$ | 2,4-dimethyl-4,5-dihydro-1H-imidazole | 3:1:1:1 | liquid |
| Example 8 | maleimide (NH) & N-(4-sulfonatophenyl)maleimide, Na salt | bis-maleimide-PPG-PEG-PPG block, (PPG)-(OCH$_2$CH$_2$)$_{10}$-(PPG) | 2,4-dimethyl-4,5-dihydro-1H-imidazole | 3:1:1:1 | liquid |
| Example 9 | maleimide (NH) & N-(4-sulfonatophenyl)maleimide, Na salt | bis-maleimide-PEG, (OCH$_2$CH$_2$)$_{7.5}$ | 2,4-dimethyl-4,5-dihydro-1H-imidazole | 3:1:1:0.5 | liquid |

TABLE 1-continued

| | reactant (a) | reactant (b) | reactant (c) | Molar ratio between reactants | phase |
|---|---|---|---|---|---|
| Example 10 | maleimide & N-(4-sulfonatophenyl)maleimide sodium salt | bis-maleimide PEG (n=7.5) | 2,4-dimethyl-4,5-dihydro-1H-imidazole | 3:1:1:0.25 | liquid |
| Example 11 | maleimide & N-(4-sulfonatophenyl)maleimide sodium salt | bis-maleimide PEG (n=7.5) | 2,4-dimethyl-4,5-dihydro-1H-imidazole | 2:2:1:1 | liquid |
| Example 12 | maleimide & N-(4-sulfonatophenyl)maleimide sodium salt | bis-maleimide PEG (n=7.5) | 2,4-dimethyl-4,5-dihydro-1H-imidazole | 2:2:1:0.5 | liquid |
| Example 13 | maleimide & N-(4-sulfonatophenyl)maleimide sodium salt | bis-maleimide PEG (n=7.5) | 2,4-dimethyl-4,5-dihydro-1H-imidazole | 1:1:1:1 | liquid |

TABLE 1-continued
| | reactant (a) | reactant (b) | reactant (c) | Molar ratio between reactants | phase |
|---|---|---|---|---|---|
| Example 14 | 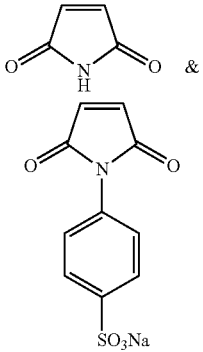 | 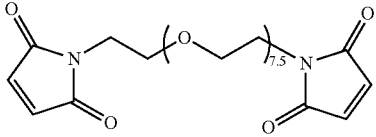 | 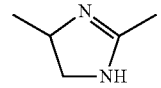 | 5:1:1:1 | liquid |
| Example 15 | 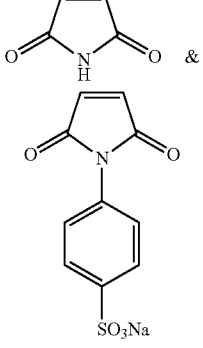 | 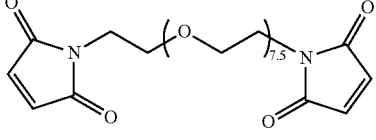 | 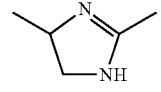 | 5:3:2:0.05 | gel |
| Example 16 | 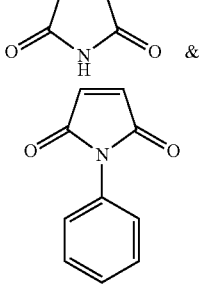 | 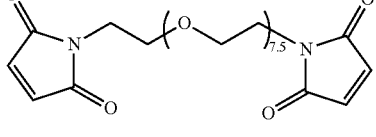 | 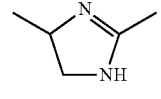 | 3:1:1:1 | liquid |
| Example 17 | 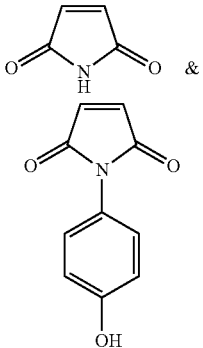 | 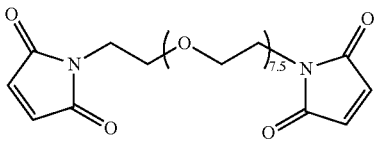 | 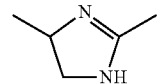 | 3:1:1:1 | liquid |

TABLE 1-continued

| | reactant (a) | reactant (b) | reactant (c) | Molar ratio between reactants | phase |
|---|---|---|---|---|---|
| Example 18 | | | | 3:1:1:1 | liquid |
| Example 19 | | | | 3:1:1:1 | liquid |
| Example 20 | | | | 3:1:1:1 | liquid |
| Example 21 | | | | 3:1:1:1 | liquid |

Accordingly, since the flexible maleimide polymer of the disclosure is prepared by reacting a N-phenylmaleimide having a specific function group (such as sulfonic group) with bismaleimide having a flexible and water-retaining linking chain, the flexible maleimide polymer exhibits a high mechanical strength, and water retaining capacity.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A flexible maleimide polymer, which is a reaction product of a composition consisting of a reactant (a), a reactant (b), and a reactant (c), and an organic solvent, wherein the reactant (a) has a structure represented by

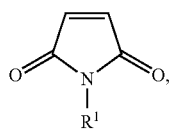

wherein R is H, —$(CH_2)_{10}$—$CO_2H$, or

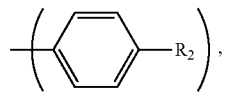

and $R_2$ is H, OH, $SO_3Na$, $NO_2$, CN or $CO_2H$;

the reactant (b) is a compound with a structure represented by formula (III)

Formula (III)

wherein A is

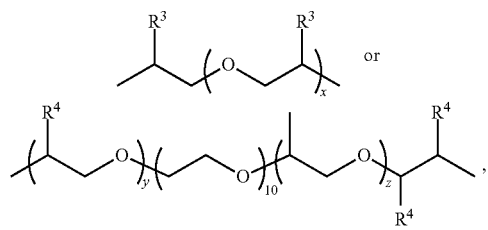

$R^3$ is H or methyl group, x is between 1-12, $R^4$ is H or methyl group, and y and z are both between 1-5; and the reactant (c) is a compound with a structure represented by formula (IV), or a compound with a structure represented by formula (V)

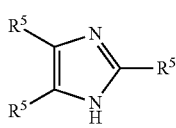

Formula (IV)

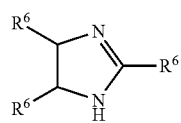

Formula (V)

wherein $R^5$ and $R^6$ are independent H or $C_{1-4}$ alkyl group, and wherein the molar ratio between the reactant (a) and the reactant (c) is from 16:1 to 1:1, and the molar ratio between the reactant (b) and the reactant (c) is from 4:1 to 1:1.

2. The flexible maleimide polymer as claimed in claim 1, wherein the reactant (a) is a compound with a structure represented by Formula (I) of

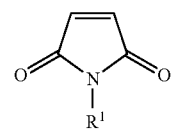

or a compound with a structure represented by Formula (II) of

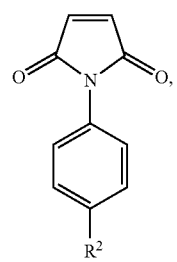

wherein $R^1$ is —$(CH_2)_{10}$—$CO_2H$, and $R_2$ is H, OH, $SO_3Na$, $NO_2$, CN or $CO_2H$.

3. A method for preparing flexible maleimide polymer as claimed in claim 1, comprising:

polymerizing a reactant (a) with a reactant (b) in the presence of a reactant (c) and an organic solvent to obtain the flexible maleimide polymer, wherein the reactant (a) has a structure represented by

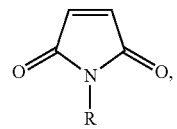

wherein R is H, —$(CH_2)_{10}$—$CO_2H$, or

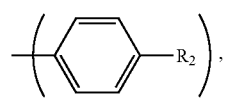

and $R_2$ is H, OH, $SO_3Na$, $NO_2$, CN or $CO_2H$;

the reactant (b) is a compound with a structure represented by formula (III)

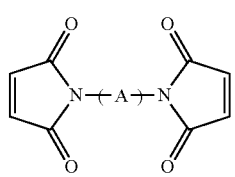

Formula (III)

wherein A is

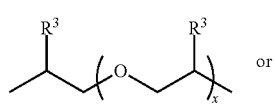

-continued

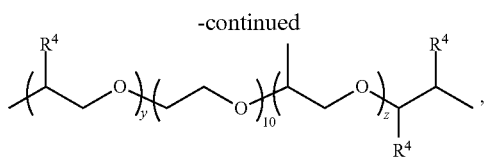

$R^3$ is H or methyl group, x is between 1-12, $R^4$ is H or methyl group, and y and z are both between 1-5; and
the reactant (c) is a compound with a structure represented by formula (IV), or a compound with a structure represented by formula (V)

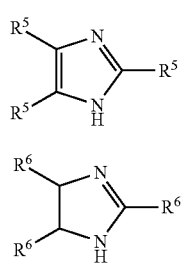

Formula (IV)

Formula (V)

wherein $R^5$ and $R^6$ are independent H or $C_{1-4}$ alkyl group, and wherein the molar ratio between the reactant (a) and the reactant (c) is from 16:1 to 1:1, and the molar ratio between the reactant (b) and the reactant (c) is from 4:1 to 1:1.

4. The method as claimed in claim 3, wherein the reactant (a) is a compound with a structure represented by Formula (I) of

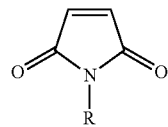

or a compound with a structure represented by Formula (II) of

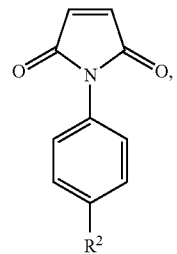

or the molar ratio between the compound with the structure represented by Formula (II) and the reactant (c) is from 4:0.05 to 1:1, wherein $R^1$ is —$(CH_2)_{10}$—$CO_2H$, and $R_2$ is H, OH, $SO_3Na$, $NO_2$, CN or $CO_2H$.

* * * * *